Patented Oct. 15, 1940

2,217,918

UNITED STATES PATENT OFFICE 2,217,918

PROCESS OF PRODUCING RUBBER MISCIBLE OILS

Fritz Rostler and Vilma Mehner, Vienna, Germany, assignors to Naftolen-Gesellschaft zur Verwertung der Rostler-Mehner'schen Verfahren m. b. H., Vienna, Germany, a corporation of Austria, now Germany No Drawing. Application August 12, 1938, Serial No. 224,626. In Germany October 30, 1937

3 Claims. (Cl. 196—13)

This invention or discovery relates to rubber miscible oils; and it comprises a method of preparing such oils wherein petroleum oils are extracted with any of several suitable selective solvents, the resulting extract is separated from the solvent, extracted substances which boil below 160° or some higher temperature at a pressure of 12 mm. mercury are removed by distillation which is advantageously under vacuum, and the residue is neutralized with alkali and generally fractionated, with or without separation into portions soluble and insoluble in sulfuric acid before neutralization, said residue comprising rubber-miscible oils of unsaturated hydrocarbon nature alone or in admixture with neutral oils insoluble in sulfuric acid; and it comprises said rubber-miscible oils alone and in admixtures with neutral oils in which they are present in amounts of at least 30 per cent, produced by the process herein described; all as more fully hereinafter set forth and as claimed.

In our prior and copending applications, Serial No. 751,891, Serial No. 138,666, Serial No. 220,584 and Serial No. 149,183, we have described and claimed the manufacture of certain new and valuable oils and oily resins of unsaturated hydrocarbon nature, which are reactive with sulfur, soluble in concentrated sulfuric acid, and have other distinctive properties. In the methods of these applications, acid sludge from refining petroleum oils heavier than kerosene is treated with a quantity of lime or other neutralizing agent more than sufficient to neutralize all the acids present. The over-limed mixture is then heated to cause it to split smoothly into an inorganic and an organic portion, the latter being the oils desired. These are recovered by distillation, extraction, or in other ways. In our applications Serial No. 52,322 and Serial No. 166,392 we have described various applications of these rubber miscible, vulcanizable hydrocarbons or oils in the rubber industry and related industries.

In purifying petroleum oils with sulfuric acid, the sulfuric acid takes out certain portions of the oils with which it combines and with which it forms the body of the acid sludge. Solvent extraction methods of refining petroleum take out of the oil the same residues that are taken out in treating the oil with sulfuric acid, and some other materials including usually a certain amount of neutral oil. These residues and materials, including unsaturated and aromatic hydrocarbons, are left in the "extract" formed by evaporating the solvent from the solution obtained in solvent refining. An object achieved by the present invention is to prepare from this extract a new material useful in the rubber industry and related industries, including the fields of synthetic resin plastics and coatings.

It is known to use mineral oil products like vaseline oil and paraffin as softeners in rubber mixtures, but these materials can only be employed in relatively small amounts, since large additions of this kind have too much softening effect on the rubber mixtures. Other common organic additions to rubber mixtures, such as sulfurized vegetable oils known as "factis," or blown asphalts, result in a reduction in the quality of the finished goods when the addition is in large amount. In recent times, synthetic products such as butadiene polymers and mixed polymers have been tried as substitutes for rubber or as organic additions to rubber mixtures. These polymerized synthetic additions do not injure the quality of the goods, but at present they are so expensive that their use on a large scale is out of the question, on economic grounds.

In one aspect, the present invention consists in forming new organic materials for rubber mixtures from certain waste products of the refining of petroleum, which materials can be incorporated in the mixtures in large amounts as filling and bulking agents. The extensive use of these new addition materials makes for a substantial economy of caoutchouc without reducing the quality of the rubber goods produced, and often results in an improvement in quality. As starting materials, we employ the substances produced in the refining of petroleum products with selective solvents such as nitrobenzene, furfural, dichlordiethyl ether, liquid $SO_2$ in mixture wtih organic solvents such as benzol, etc., and others. That is, we employ the materials dissolved from the petroleum by any of various selective solvents and remaining as residues when the solvents are removed. From these oil refinery wastes it has been found possible to make materials which are generally useful as filling and bulking agents in the rubber industry and which have utility which is not limited to the use of a small quantity of the material, if the material is properly selected. We have found that the desired rubber extending materials of suitable nature are obtained from solvent refining residues from which there have been separated all acid, asphaltic and coky constituents, and at least those constituents boiling below 160° C. (even better, those boiling below 200° C., or higher) at 12 mm. Hg. Advantageously, only those remaining constituents are selected which have a viscosity higher than that of the oils in the refining of which the employed extracts originated.

In one embodiment of our invention, the residue of the solvent extract, after distilling off the solvent and all constituents boiling below 160° at 12 mm. Hg, (preferably those constituents boiling below 200 C. at this pressure) is neutralized with alkaline material; for example, lime or magnesia in suitable form. The hydrocarbon phase to be used according to the invention is then separated, as by decantation or filtration, from the other phase or other phases, such as solutions or suspensions of the neutralizing agents, or other suspended materials. The hydrocarbon filtrate so obtained is advantageously subjected to a distillation over alkaline material, such as a further quantity of magnesia or lime, whereby any easily volatile constituents boiling below 160° C. at 12 mm. Hg, which may still be contained in the hydrocarbon mixture, are removed. The top boiling range of the most useful preparation is about 350° C. at 12 mm. Hg.

In a second embodiment, the rubber-miscible, oily material to be used according to the invention is obtained in the following manner. The residue remaining after distilling off the solvent from the extract is neutralized with alkaline material, such as lime or magnesia, and is then subjected to a fractional vacuum distillation. Fractions are selected which contain no constituents boiling below 160° C. at a vacuum of 12 mm. Hg and whose upper boiling range lies no higher than 380° C. at the vacuum mentioned. The hydrocarbon mixture so obtained may be further divided by distillation into still other fractions having different properties, the higher boiling fractions being preferable for most purposes in the rubber industry.

An advantage of this procedure lies in the fact that the extraction residues mentioned may be thus worked up for the recovery of the desired hydrocarbons, even when the extracts are mixed with the highly acid wastes of mineral oil refining known as acid sludge. This circumstance is particularly important when both kinds of refinery wastes are produced in the same refinery. These may, according to the invention, be utilized together in one process. In operating, the half-solid to viscous fluid acid mixture so obtained is carefully neutralized with alkaline materials, advantageously their solutions or suspensions, whereby the development of heat of neutralization usually makes the supply of further heat unnecessary. After separation of the inorganic salts formed, advantageously in solution, the neutral organic reaction product obtained is subjected to fractional vacuum distillation under the stated conditions, and the fractions boiling below 160° C. or higher are discarded. Only the higher boiling fractions are used.

The selection of the refinery waste which is to serve as the starting material is advantageously so made that waste materials are used which in themselves approach, although in a crude state, the above described requirements. Most desirable, therefore, are extracts from the refining of medium and heavy lubricating oils, wherein the nature of the solvent used for refining plays no essential role. Products from the refining of kerosene and other low boiling petroleum fractions cannot be used. Only petroleum products of low viscosity are refined with liquid $SO_2$ without addition of an organic solvent, and the utilization of the residues from this method of refining is therefore generally impracticable. The extracts obtained with most of the other known solvents employed with medium and heavy oils are suitable, however.

The products obtained according to the described process are red-brown, greenly fluorescent, oils, resembling more or less fluid resins; they are transparent in thin layers, free of acid constituents, and free of carbon and coke particles and other impurities causing heterogeneity, and they contain no materials which decompose on heating to 180° C. for 2 hours. The viscosity of these materials averages about 4° (Engler) at 100° C., and they are especially characterized in that a large proportion of them (at least 30 per cent) is soluble in concentrated sulfuric acid. Advantageously the acid soluble portion is considerably larger than 30 per cent, and in practice it is sometimes 90 per cent or more. The balance consists principally of neutral or saturated oils. When completely acid-soluble oils are desired, resembling those obtained by the processes of our above-mentioned applications, they may be obtained by treating the solvent extracts with concentrated sulfuric acid. The insoluble oils separate as a supernatant layer, which is discarded. The soluble constituents combine with the $H_2SO_4$ to form a product similar to acid sludge, which may be thermolytically decomposed with excess lime or other neutralizing agent to separate the hydrocarbon oils, as in our earlier applications. The oils are then fractionated and portions boiling below 160° C. at 12 mm. Hg are discarded. These acid soluble materials are apparently polymerized but still somewhat unsaturated hydrocarbons of relatively low iodine number. Analysis of numerous samples has indicated a composition of approximately 90 per cent carbon and 10 per cent hydrogen, corresponding to the formula $(C_3H_4)_n$. Molecular weights range from about 400 to about 1000, with materials of the desired characteristics averaging about 600.

The products obtained in each of the methods above-described consist, at least insofar as they are soluble in sulfuric acid, of unsaturated hydrocarbons which are capable of a fargoing reaction with sulfur, which nearly approaches caoutchouc vulcanization. They therefore behave less like foreign bodies in rubber mixtures than the other additions heretofore employed, which are not capable of such a reaction. They offer the further advantage that they facilitate the mixture or dispersion of fillers of all kinds in rubber mixtures, and they can be incorporated in soft rubber mixtures as well as hard rubber mixtures and mixtures of caoutchouc dispersions. They generally exercise a distinct softening action. The amounts which can be used are largely dependent on the nature of the mixtures, varying usually from 10 or 15 per cent to 50 per cent of the pure caoutchouc used, although satisfactory results have been obtained with additions of 65 to 80 per cent or more (on effective caoutchouc).

The new hydrocarbon products to be used according to the invention may also be worked up with old rubber, where they form, on plasticizing the old rubber, regenerates of great flexibility. These contain the materials added according to the invention as filling or extending agents, and may be worked up as usual to finished articles in admixture with crude rubber or with further additions of these hydrocarbons or both. Several methods of employing hydrocarbon products of this type in the regeneration and "devulcanization" of waste rubber are described in more detail in our copending application Serial No. 166,392, whereof the present application is in part a continuation, and in our application Serial No. 263,810.

The term caoutchouc in the present application includes natural and synthetic caoutchouc, as well as rubber substitute products.

Various embodiments of our invention are illustrated in the following examples:

*I*

100 parts of extract residue from refining mineral oil with furfural were neutralized with 5 parts MgO, after distilling off the solvent and the constituents boiling below 160° C. at 12 mm. mercury. The bottom (largely inorganic) layer was separated, and the remaining product distilled in vacuo. The second fraction, boiling between 180° and 320° C. at 20 mm. mercury, was employed in the following mixtures:

(1)
| | |
|---|---|
| Bright crepe | 48.00 |
| Smoked sheets | 32.00 |
| Addition according to the invention | 13.50 |
| Sulfur | 2.50 |
| Vulcacit F (IGF) | .60 |
| Stearic acid | .40 |
| Zinc oxide (active) | 3.00 |
| | 100.00 |

Vulcanization for 20 minutes at four atmospheres produced a transparent yellow finished product with a breaking strength of 208 kg./cm.$^2$, which, after three days aging in a Bierer-Davis bomb, showed a value of 202 kg./cm.$^2$.

(2)
| | |
|---|---|
| Smoked sheets | 38.70 |
| Brown crepe | 20.00 |
| Micronex (carbon black) | 28.90 |
| Stearic acid | 0.60 |
| Sulfur | 2.50 |
| Zinc oxide | 3.30 |
| Vulcacit mercapto | 0.80 |
| Addition according to the invention | 5.20 |
| | 100.00 |

Vulcanization for 35 minutes at 1.5 atmospheres produced a finished product well suited for tire casings, which gave the following test results:

| | | |
|---|---|---|
| Tension at 300 per cent | kg./cm.$^2$ | 102 |
| After 3 days aging | kg./cm.$^2$ | 100 |
| Tensile strength | kg./cm.$^2$ | 243 |
| After 3 days aging | kg./cm.$^2$ | 245 |
| Extension | per cent | 540 |
| After 3 days aging | do | 500 |
| Specific gravity | | 1.16 |
| Hardness (Schopper) | | 86 |

(3)
| | |
|---|---|
| Brown crepe | 12.50 |
| Smoked sheets | 12.50 |
| Addition according to the invention | 8.90 |
| Sulfur | 1.30 |
| Mercapto | 0.35 |
| Vulcacit D | 0.10 |
| Zinc oxide | 2.50 |
| Micronex | 55.00 |
| Regenerate | 6.85 |
| | 100.00 |

Vulcanization for 20 minutes at four atmospheres produced a finished product with the following characteristics, which was well suited for sole plates.

| | | |
|---|---|---|
| Breaking strength | kg./cm.$^2$ | 66.5 |
| After 3 days aging | kg./cm.$^2$ | 64 |
| Extension | per cent | 110 |
| After 3 days aging | do | 102 |
| Specific gravity | | 1.39 |
| Hardness (Schopper) | | 6.00 |

*II*

100 parts of the residue from refining lubricating oil with a mixture of liquid SO$_2$ and benzene were neutralized by mixing with three parts of technical MgO and the neutralization mixture was subjected to a vacuum distillation. The portion boiling below 200° C. at 12 mm. mercury was withdrawn, and the following mixtures were made with the fraction boiling between 200° and 380° C. at 12 mm. mercury.

(4)
| | |
|---|---|
| Smoked sheets | 20.00 |
| Magnesium carbonate | 46.50 |
| Magnesium oxide | 4.00 |
| Zinc oxide | 3.00 |
| Titanium white | 2.00 |
| Red iron oxide | 2.20 |
| Age retarder MG (IGF) | 0.30 |
| Colloidal kaolin | 10.00 |
| Sulfur | 1.50 |
| Vulcacit F | 0.50 |
| Addition according to the invention | 10.00 |
| | 100.00 |

Vulcanization for 15 minutes at 3 atmospheres gave a finished product with the following properties:

| | | |
|---|---|---|
| Tensile strength | kg./cm.$^2$ | 46 |
| After 3 days aging | kg./cm.$^2$ | 45.5 |
| Extension | per cent | 40 |
| After 3 days aging | do | 38 |
| Specific gravity | | 1.68 |
| Hardness (Schopper) | | 19.00 |

(5)
| | |
|---|---|
| Smoked sheets | 30.00 |
| Addition according to invention | 15.00 |
| Vulcacit CT | 0.30 |
| Sulfur | 6.60 |
| Hard rubber dust | 34.00 |
| Zinc oxide | 3.00 |
| Aldol | 0.30 |
| Chalk | 10.80 |
| | 100.00 |

Vulcanization for 60 minutes at 4 atmospheres produced a half-hard sheet with the following properties:

| | | |
|---|---|---|
| Tensile strength | kg./cm.$^2$ | 122 |
| After 3 days aging | kg./cm.$^2$ | 83 |
| Elongation | per cent | 125 |
| After 3 days aging | do | 10 |
| Specific gravity | | 1.23 |

(6)
| | |
|---|---|
| Smoked sheets | 100.00 |
| Addition according to invention | 70.00 |
| Sulfur | 45.00 |
| Vulcacit D | 1.00 |

Vulcanization for 90 minutes at 4 atmospheres produced a hard rubber with a tensile strength of 540 kg./cm.$^2$.

(7) Rubber cement:
  Smoked sheets _____ 210.00
  Addition according to invention _____ 105.50
  Zinc oxide _____ 52.50
  Carbon black _____ 2.00
  Gasoline _____ 630.00
                                  ———
                                  1000.00

III

Into a solution of 20 parts technical MgO in 150 parts of water, heated to boiling, a mixture of 100 parts acid sludge from sulfuric acid refining of lubricating oil and 100 parts of extract residue from lubricating oil refining with a mixture of liquid $SO_2$ and benzol was added in portions. The quantity of neutralizing agent was so calculated that it sufficed to neutralize the total acidity of the mixture of wastes. After separation of the solution of inorganic salts which was formed, the neutral organic reaction product was subjected to a fractional vacuum distillation, and the portion boiling between 180° and 340° C. at 20 mm. mercury was recovered and used in the preparation of materials useful in the rubber industry. The yield was 70 per cent of the total mixture.

The hydrocarbons obtained from this mixture of refinery wastes, as well as those obtained from acid sludge alone, are characterized by imparting a more rapid vulcanization to mixtures containing them than is the case with hydrocarbons obtained from solvent extracts alone, but are otherwise quite similar.

Regeneration of waste rubber may be effected by heating with any of these hydrocarbons alone, but is best accomplished by heating the rubber with hydrocarbons and aqueous bases, as described in more detail in our applications Serial Nos. 166,392 and 263,810. For example, old tire casings are heated with 10 to 15 per cent of these hydrocarbons and 12 per cent caustic soda and enough water to cover the mixture, for 8 to 24 hours at a pressure of 12 to 14 atmospheres, with agitation. The aqueous solution is withdrawn, and the regenerate is washed, dried and worked on the rolls, strained, preferably by a spray head, and rolled together and drawn out into a sheet. The hydrocarbons added remain in the regenerate and have a beneficial effect, as well as increasing the quantity. Regeneration may also be effected by employing these hydrocarbons and heating with superheated steam, without use of this caustic. This increases the quantity of the yield, but the quality is impaired. In either method from 25 to 30 per cent of these hydrocarbons may be employed when an especially plastic regenerate is desired.

What we claim is:

1. The method of manufacturing hydrocarbon products adapted for incorporation in rubber mixtures in amounts exceeding 50 per cent on the caoutchouc and capable of vulcanization therewith, which comprises refining a petroleum oil heavier than kerosene with a selective solvent, separating the solvent from the substances extracted from the oil thereby, mixing the residual substances with acid sludge from the sulfuric acid refining of petroleum oils treating the mixture with an excess of alkaline neutralizing agent to form an organic reaction product, and distilling the organic reaction product in vacuum to recover the desired hydrocarbon material boiling between 160° and 380° C. at 12 mm. Hg, said material being neutral and at least 30 per cent soluble in concentrated sulfuric acid.

2. The method of manufacturing hydrocarbon products adapted for incorporation in rubber mixtures in amounts exceeding 50 per cent on the caoutchouc and capable of vulcanization therewith, which comprises refining a petroleum oil heavier than kerosene with a selective solvent, separating the solvent from the substances extracted from the oil thereby, mixing the residual substances with concentrated sulfuric acid to form an acid solution containing a substantial portion of said substances, withdrawing the portion undissolved in said acid, neutralizing the acid solution with an excess of alkaline material to form an organic reaction product, and distilling the organic reaction product in vacuum to recover the desired hydrocarbon material boiling between 160° and 380° C. at 12 mm. Hg, said material being neutral and completely soluble in concentrated sulfuric acid.

3. The method of manufacturing hydrocarbon products adapted for incorporation in rubber mixtures in amounts exceeding 50 per cent on the caoutchouc, and capable of co-vulcanization with rubber and sulfur in such mixtures to produce rubber goods of high quality, which comprises refining a petroleum oil heavier than kerosene with a selective solvent, separating the solvent from the substances extracted from the oil thereby, treating the residue to eliminate acid substances and constituents which boil outside of the range from 160° to 380° C. at 12 mm. Hg, determining the solubility in concentrated sulfuric acid of portions of the remaining residue having different boiling ranges, and fractionally distilling said remaining residue to recover fractions thereof which are at least 30 per cent soluble in said acid, the recovered fractions constituting a predominantly hydrocarbon material which is substantially neutral and is capable of the said co-vulcanization with rubber and sulfur.

FRITZ ROSTLER.
VILMA MEHNER.